(12) United States Patent
Laney

(10) Patent No.: US 7,629,579 B2
(45) Date of Patent: Dec. 8, 2009

(54) ELECTRONIC SYSTEM TO MANAGE EXTERNAL RADIATION EFFECTS

(75) Inventor: Clifton Laney, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 11/475,351

(22) Filed: Jun. 27, 2006

(65) Prior Publication Data

US 2007/0295905 A1    Dec. 27, 2007

(51) Int. Cl.
*G01T 1/00* (2006.01)
(52) U.S. Cl. .................................. 250/336.1
(58) Field of Classification Search ............... 250/336.1, 250/338.1, 472.1, 370.07
See application file for complete search history.

(56) References Cited

U.S. PATENT DOCUMENTS

| | | | | |
|---|---|---|---|---|
| 3,769,710 A | * | 11/1973 | Reister | 33/320 |
| 3,916,185 A | * | 10/1975 | Jehly | 250/231.18 |
| 4,948,989 A | * | 8/1990 | Spratt | 327/513 |
| 5,132,543 A | * | 7/1992 | Valentine et al. | 250/388 |
| 5,339,070 A | * | 8/1994 | Yalowitz et al. | 340/578 |
| 6,267,039 B1 | * | 7/2001 | Czarnecki | 89/1.11 |
| 7,038,398 B1 | * | 5/2006 | Lys et al. | 315/291 |
| 2001/0028227 A1 | * | 10/2001 | Lys et al. | 315/317 |
| 2005/0230602 A1 | * | 10/2005 | Glehr et al. | 250/214 R |
| 2006/0097171 A1 | * | 5/2006 | Balchunas et al. | 250/336.1 |
| 2006/0163493 A1 | * | 7/2006 | Antanouski | 250/484.5 |

FOREIGN PATENT DOCUMENTS

GB          1214906 A   * 12/1970

* cited by examiner

*Primary Examiner*—David P Porta
*Assistant Examiner*—Faye Boosalis
(74) *Attorney, Agent, or Firm*—Buckley, Maschoff & Talwalkar LLC

(57) ABSTRACT

A system may include determination of a value of a radiation-related parameter, and changing of an operational parameter of a circuit based on the determined value. The radiation-related parameter may comprise an altitude of the circuit and/or a radiation level. In some aspects, the operational parameter may be a supply voltage and/or a period of a refresh cycle.

10 Claims, 4 Drawing Sheets

ELECTRONIC SYSTEM TO MANAGE EXTERNAL RADIATION EFFECTS

BACKGROUND

External radiation absorbed by a computing system may result in transient, inconsistent data errors that are unrelated to component or manufacturing failures. Although many systems are able to tolerate these errors to some degree, radiation-caused data errors may also lead to loss of function and system-critical failures in mission-critical applications.

More specifically, the charge (electron-hole pairs) generated by the interaction of an energetic charged particle with semiconductor atoms of a silicon device may corrupt the data stored therein. These charged particles can come directly from radioactive materials (e.g., radioactive isotopes in integrated circuit packaging materials, solder bump materials used in flip-chip packaging) and cosmic rays/solar particles (which interact with the upper atmosphere to generate high-energy protons and neutrons), or indirectly as a result of high-energy particle interaction with the semiconductor itself. Shrinking geometries and decreasing operating voltages increase the chances of radiation-caused data errors.

A product designer may attempt to minimize the rate of such errors through design choices including circuit design, semiconductor material, package material, substrate material, and device geometry. These choices will necessarily result in trade-offs with the competing goals of reducing device size, reducing operating voltage, increasing operating speed, and reducing power dissipation. However, these trade-offs will result in inefficiencies during most intended uses, as the resulting product will rarely, if ever, operate in the worst-case radiation scenario for which it was designed.

DETAILED DESCRIPTION

Figure 1:
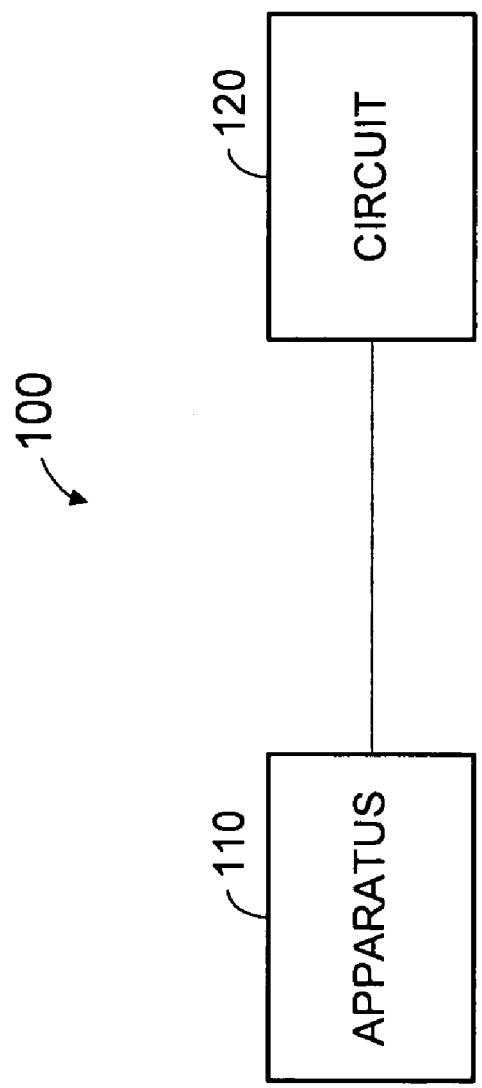
FIG. 1 is a block diagram of an apparatus according to some embodiments.

FIG. 1 is a block diagram of system 100 according to some embodiments. System 100 may, according to some embodiments, comprise elements of a computing system (e.g., a laptop computer) and/or other electrical device (e.g., a microprocessor, a memory device). The various systems described herein are depicted for use in explanation, but not limitation, of described embodiments. Different types, layouts, quantities, and configurations of any of the systems described herein may be used without deviating from the scope of some embodiments.

System 100 includes apparatus 110 and circuit 120. Apparatus 110 may comprise a sensor to determine a value of a radiation-related parameter and a control circuit to change an operational parameter of circuit 120 based on the determined value. The radiation-related parameter may provide an indication of an amount of radiation to which circuit 120 is being subjected. The radiation-related parameter may comprise, but is not limited to, an altitude of circuit 120, an altitude of apparatus 110, a radiation level experienced by circuit 120, and a radiation level experienced by apparatus 110. Further, the radiation-related parameter may also or alternatively comprise a Boolean indicator of whether any of the foregoing parameters lie within a particular range of values, have exceeded a given threshold or have fallen below a given threshold. The sensor and the control circuit of apparatus 110 may comprise any combination of hardware, software and firmware to perform the functions described herein.

The changed operational parameter of circuit 120 may comprise, but is not limited to, a supply voltage, a supply current, and a period of refresh cycle. Circuit 120 comprises a microprocessor according to some embodiments. In some embodiments, circuit 120 comprises a memory element such as a Dual In-line Memory Module. Circuit 120 may comprise any circuit, including any integrated circuit, that is or becomes known.

Figure 2:
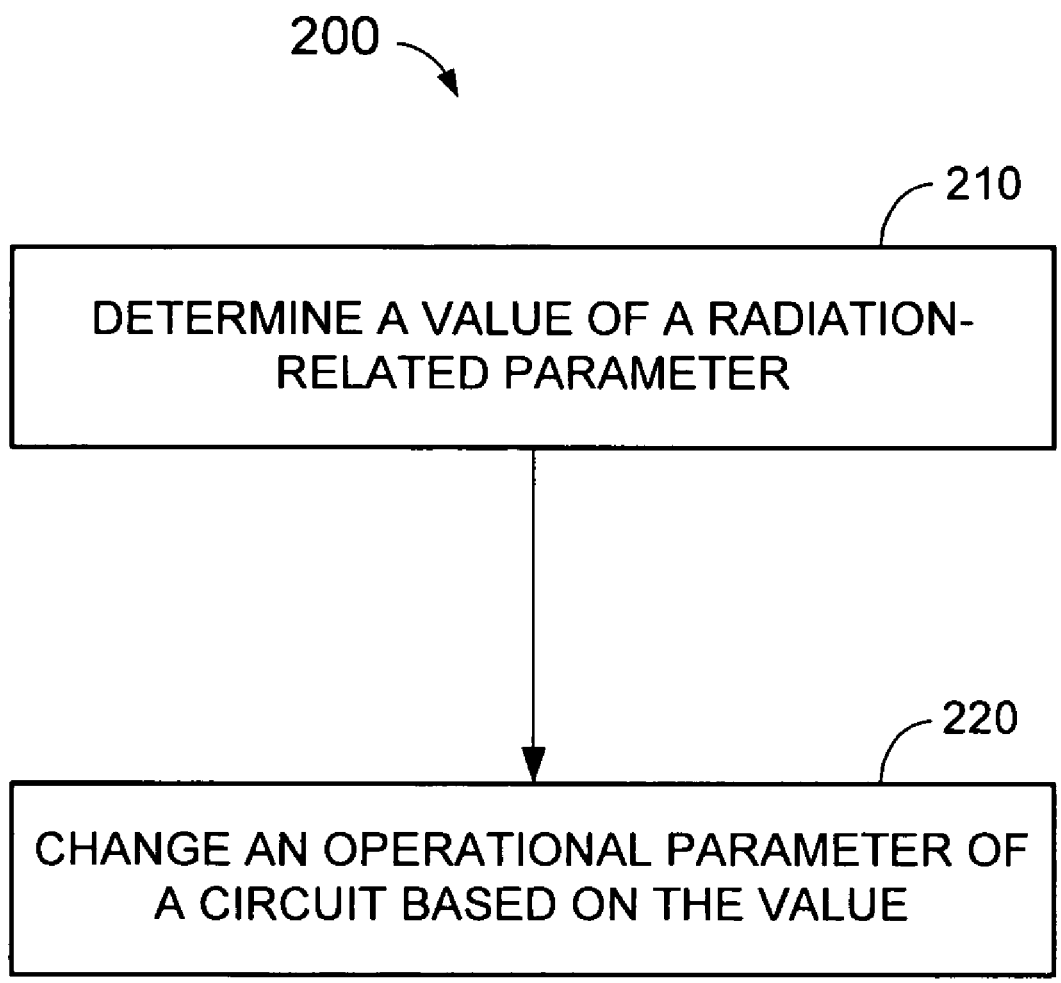
FIG. 2 is a diagram of a process according to some embodiments.

FIG. 2 is a flow diagram of process 200 according to some embodiments. Process 200 may be implemented by any suitable combination of hardware, software, and firmware, including but not limited to implementations of apparatus 110.

At 210, a value of a radiation-related parameter is determined. The value may comprise, as noted above, an altitude, a radiation level, or a Boolean indicator. Values such as an altitude and a radiation level may be directly sensed using an altimeter and a Geiger counter, respectively, and/or may be received from an external source. For example, apparatus 110 may transmit its location and/or the location of circuit 120 to an external source over the World Wide Web and receive in return an estimated radiation level corresponding to the location. Any other radiation-related parameters or systems to determine such parameters may be employed in some embodiments.

Next, at 220, an operational parameter of a circuit is changed based on the value. The operational parameter may comprise a supply voltage. For example, it may be determined at 210 that circuit 120 and/or apparatus 110 has exceeded a predefined altitude. Accordingly, a supply voltage of circuit 120 may be increased at 220. Similarly, a supply voltage of circuit 120 may be decreased at 220 if it is determined at 210 that circuit 120 and/or apparatus 110 has fallen below the predefined altitude. In some embodiments, the above-described may consider several predefined thresholds. For example, the supply voltage may be changed to any of several supply voltages, with each of the several supply voltages being associated with a particular range of altitudes. Some embodiments of the foregoing may reduce the likelihood of radiation-caused errors to an acceptable level while providing improved power efficiency and/or design flexibility.

According to some embodiments, the determination at 210 comprises detecting a change in the value of the radiation-related parameter. In some of these embodiments, flow returns from 220 to 210 to wait for a subsequent change in the value. Some embodiments execute process 200 periodically, and, in some embodiments, flow proceeds from 210 to 220 only if it is determined that the operational parameter should be changed based on the determined or changed value of the radiation-related parameter.

Figure 3:
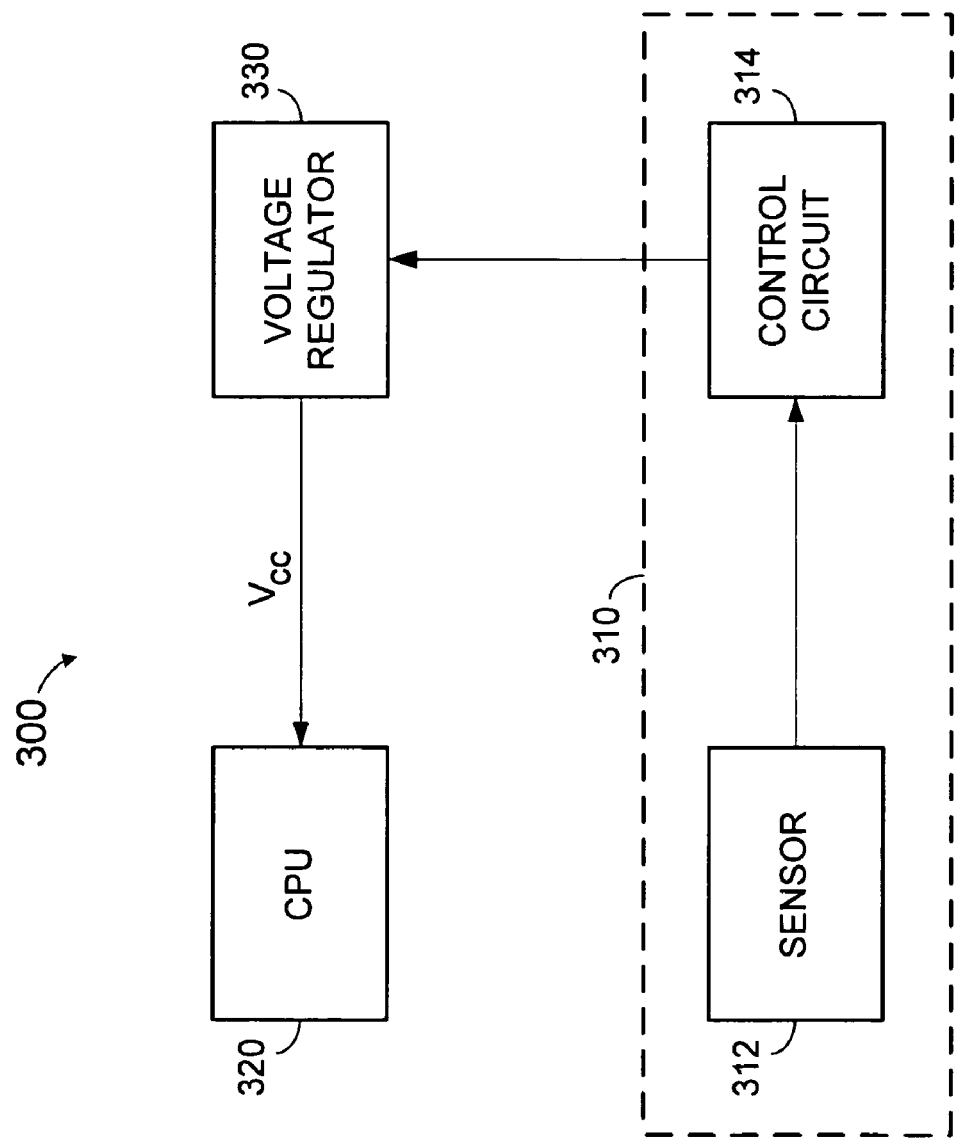
FIG. 3 is a block diagram of an apparatus according to some embodiments.

FIG. 3 is a block diagram of system 300 according to some embodiments. System 300 may comprise an implementation of system 100 of FIG. 1. In some embodiments, system 300 may operate to execute process 200 of FIG. 2. System 300 comprises apparatus 310, Central Processing Unit (CPU) 320 and voltage regulator 330. System 300 may be implemented by a single integrated circuit. In some embodiments, each of apparatus 310, Central Processing Unit (CPU) 320 and voltage regulator 330 are elements of separate integrated circuits and/or discrete components.

Apparatus 310 includes sensor 312 and control circuit 314. Sensor 312 and control circuit 314 may provide any of the functions described above with respect to identically-named elements. Generally, sensor 312 may determine a value of a radiation-related parameter and control circuit 314 may change an operational parameter of CPU 320 based on the value. In this regard, changing the operational parameter includes instructing voltage regulator 330 to change the operational parameter.

In one example of operation, sensor 312 comprises a Micro-Electro-Mechanical System (MEMS) silicon chip including piezoresistive strain gauges. Sensor 312 may therefore determine an altitude of system 300 (and/or that the altitude has exceeded a predetermined altitude). The determination is received by control circuit 314, which instructs voltage regulator 330 to increase a supply voltage (e.g., $V_{CC}$) of CPU 320 based on the determination. Embodiments are not limited to the foregoing example.

Figure 4:
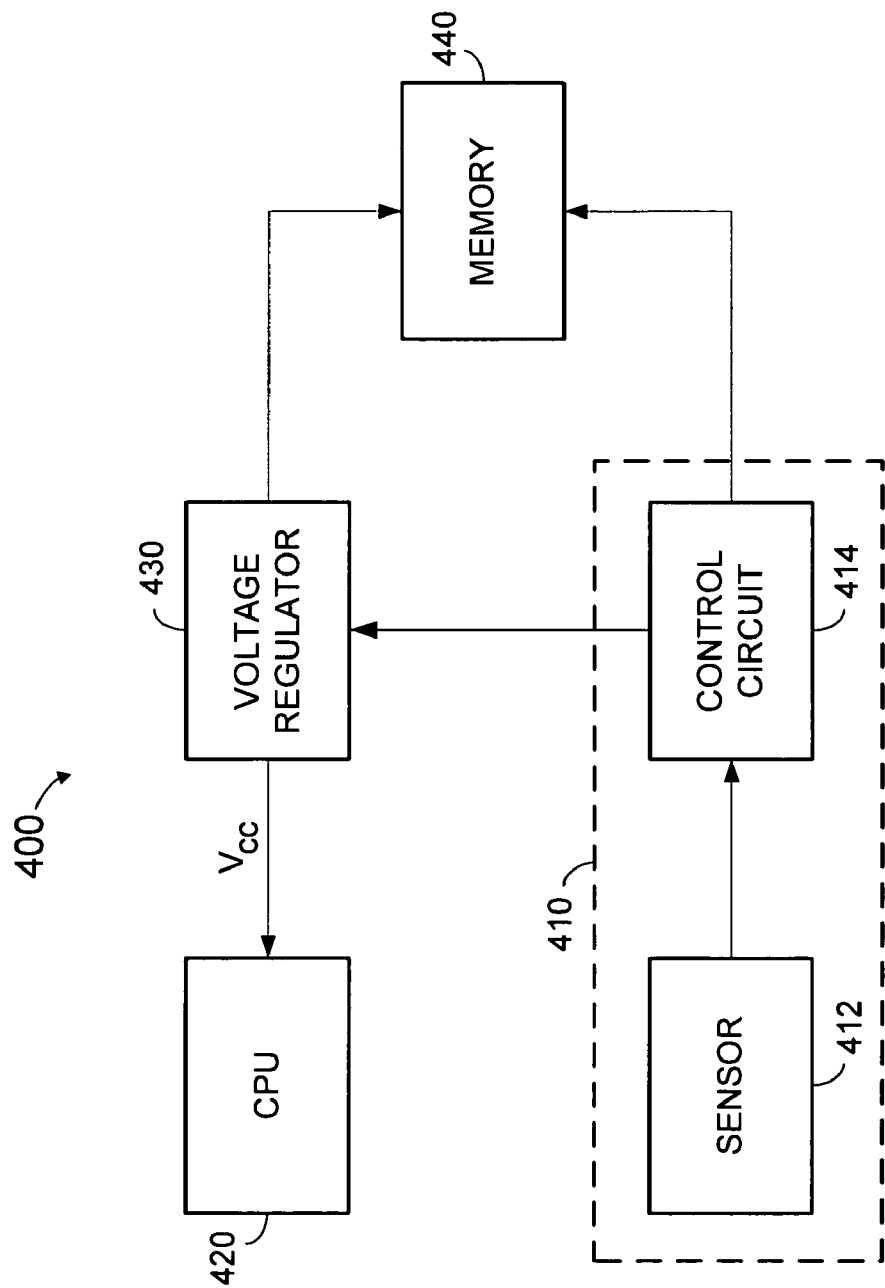
FIG. 4 is a block diagram of a system according to some embodiments.

FIG. 4 is a block diagram of system 400 according to some embodiments. System 400 may comprise an implementation of system 100 and/or system 300. Some embodiments of system 400 may operate to execute process 200 of FIG. 2. System 400 comprises apparatus 410, CPU 420, voltage regulator 430 and memory 440. Examples of memory 440 include, but are not limited to, a Single Data Rate Random Access Memory, a Double Data Rate Random Access Memory, and a Programmable Read Only Memory. System 400 may be implemented by a single integrated circuit or any number of separate integrated circuits and/or discrete components.

Apparatus 410 includes sensor 412 and control circuit 414. Sensor 412 and control circuit 414 may provide any of the functions described above with respect to identically-named elements. Moreover, control circuit 414 may operate to change an operational parameter of CPU 420 and/or of memory 440 based on a value of a radiation-related parameter.

According to one non-exhaustive example of operation, sensor 412 determines that a radiation level experienced by system 400 has fallen below a threshold level. Control circuit 414 receives the determination and instructs voltage regulator 430 to decrease supply voltage $V_{CC}$. Control circuit 414 also instructs memory 440 to decrease a period of its refresh cycle based on the determination. According to some embodiments, control circuit 414 communicates with a memory controller (not shown) to decrease the period of the refresh cycle.

Some embodiments may prevent some radiation-related errors from occurring in semiconductor devices. Accordingly it may be advantageous to implement some embodiments in conjunction with memory or other devices that provide error checking and correction as well as with devices that do not.

The several embodiments described herein are solely for the purpose of illustration. The various features described herein need not all be used together, and any one or more of those features may be incorporated in a single embodiment.

Some embodiments may include any currently or hereafter-known versions of the elements described herein. Therefore, persons skilled in the art will recognize from this description that other embodiments may be practiced with various modifications and alterations.

What is claimed is:

1. An apparatus comprising:
 a sensor to determine a value of a radiation-related parameter, wherein the radiation-related parameter comprises an altitude of a circuit; and
 a control circuit to determine that the radiation-related parameter has traversed a threshold value and to change an operational parameter of the circuit based on the determined value that has traversed the threshold value.

2. An apparatus according to claim 1, wherein the apparatus is to transmit a location of the circuit and is to receive an estimated radiation level from an external source, wherein the estimated radiation level corresponds to the location of the circuit.

3. An apparatus according to claim 2, wherein the circuit comprises a microprocessor, the apparatus further comprising:
 a voltage regulator coupled to the microprocessor to receive an instruction from the control circuit to change the supply voltage of the microprocessor.

4. An apparatus according to claim 1,
 wherein the circuit comprises a memory circuit, and
 wherein the operational parameter comprises a period of a refresh cycle.

5. An apparatus according to claim 4,
 wherein the operational parameter comprises a supply voltage.

6. A system comprising:
 a microprocessor;
 a sensor to determine a value of a radiation-related parameter, wherein the radiation-related parameter comprises an altitude of a circuit; and
 a control circuit to determine that the value of the radiation-related parameter has traversed a threshold value and to change an operational parameter of the microprocessor based on the determined value that has traversed the threshold value; and
 a double data rate memory.

7. A system according to claim 6, wherein the system is to transmit a location of the circuit and is to receive an estimated radiation level from an external source, wherein the estimated radiation level corresponds to the location of the circuit.

8. A system according to claim 7, further comprising:
 a voltage regulator coupled to the microprocessor to receive an instruction from the control circuit to change the supply voltage of the microprocessor.

9. A system according to claim 6,
 the control circuit to change an operational parameter of the memory based on the determined value.

10. A system according to claim 9,
 wherein the operational parameter comprises a period of a refresh cycle.

* * * * *

UNITED STATES PATENT AND TRADEMARK OFFICE
CERTIFICATE OF CORRECTION

PATENT NO. : 7,629,579 B2 Page 1 of 1
APPLICATION NO. : 11/475351
DATED : December 8, 2009
INVENTOR(S) : Clifton Laney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this

Second Day of November, 2010

David J. Kappos
*Director of the United States Patent and Trademark Office*